(12) United States Patent  (10) Patent No.: US 7,033,309 B1
Davis  (45) Date of Patent: Apr. 25, 2006

(54) ROLLING PIN WITH REMOVABLE GUIDE DISKS

(76) Inventor: Deberoah K. Davis, N. 75 W. 13852 Appleton Ave., Menomonee Falls, WI (US) 53051

( * ) Notice: Subject to any disclaimer, the term of this patent is extended or adjusted under 35 U.S.C. 154(b) by 0 days.

(21) Appl. No.: 10/816,715

(22) Filed: Apr. 5, 2004

Related U.S. Application Data

(60) Provisional application No. 60/486,806, filed on Jul. 14, 2003.

(51) Int. Cl.
*A21C 3/02* (2006.01)

(52) U.S. Cl. .............. 492/14; 492/19; 492/47; 7/111

(58) Field of Classification Search .......... 492/14, 492/19, 47, 13; 7/111; 29/895.22; D7/697; 193/37
See application file for complete search history.

(56) References Cited

U.S. PATENT DOCUMENTS

| 39,916 | A | | 9/1863 | Heissenbuttel |
| 353,177 | A | | 11/1886 | Taylor |
| 359,480 | A | | 3/1887 | Weber |
| 534,460 | A | | 2/1895 | Wolff et al. |
| 550,337 | A | | 11/1895 | Wolff et al. |
| 692,795 | A | * | 2/1902 | Moyle .......................... 285/81 |
| 1,534,907 | A | | 4/1925 | Broecker |
| 2,339,492 | A | | 1/1944 | Lewis |
| 2,920,389 | A | | 1/1960 | Nurmi |
| 3,994,652 | A | | 11/1976 | Kuzyk |
| 4,045,850 | A | | 9/1977 | Brandes |
| 4,435,145 | A | | 3/1984 | Abrams |
| 4,521,174 | A | | 6/1985 | Kornhauser |
| 4,718,769 | A | | 1/1988 | Conkey |
| 4,730,952 | A | * | 3/1988 | Wiley .......................... 403/316 |
| 4,964,594 | A | * | 10/1990 | Webb .......................... 244/131 |
| 6,520,464 | B1 | * | 2/2003 | Morrissey et al. ..... 248/222.52 |

* cited by examiner

*Primary Examiner*—Marc Jimenez
(74) *Attorney, Agent, or Firm*—Tipton L. Randall

(57) ABSTRACT

A clip, spacer and disk system, adapted for attachment to a cylindrical rolling pin, which has a central axle with a handle at each end, is disclosed. The guide disk members are provided in various diameters and can be exchanged on the rolling pin to provide different thicknesses of rolled out dough, without removing the handles of the rolling pin.

28 Claims, 7 Drawing Sheets

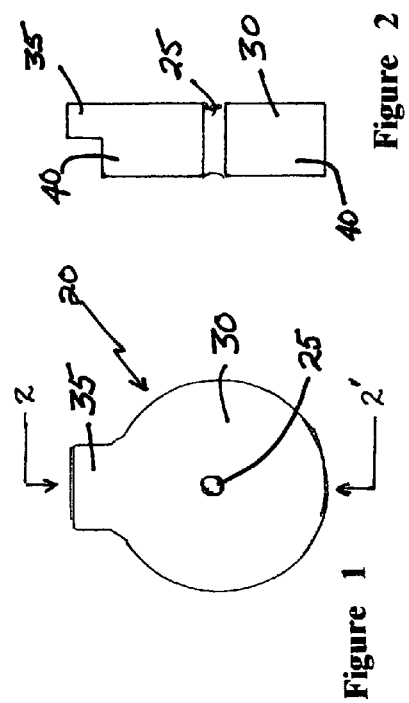
Figure 1
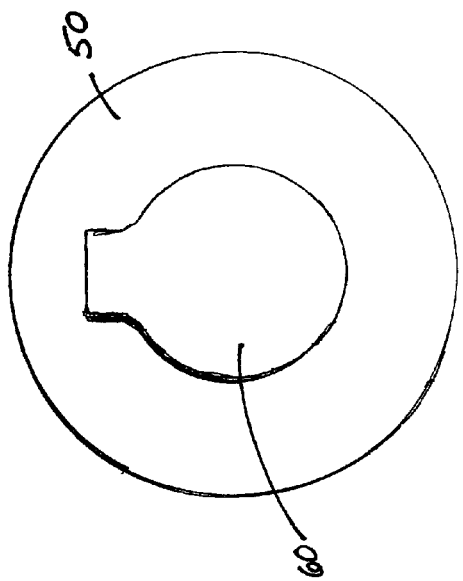
Figure 2
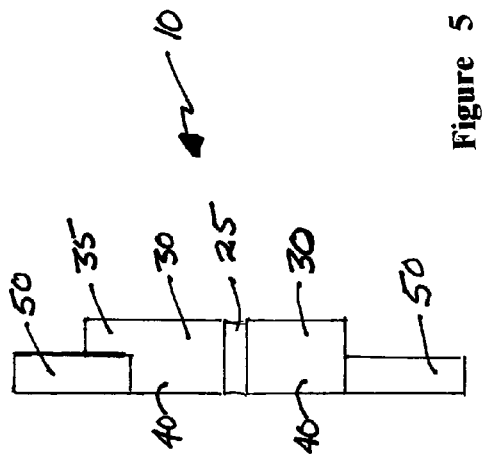
Figure 3
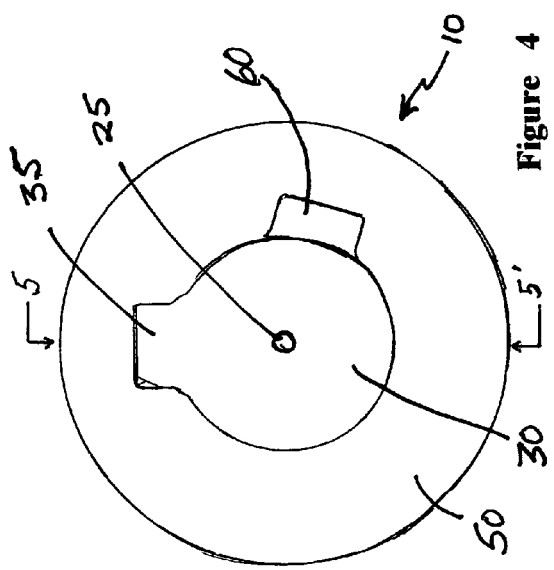
Figure 4
Figure 5

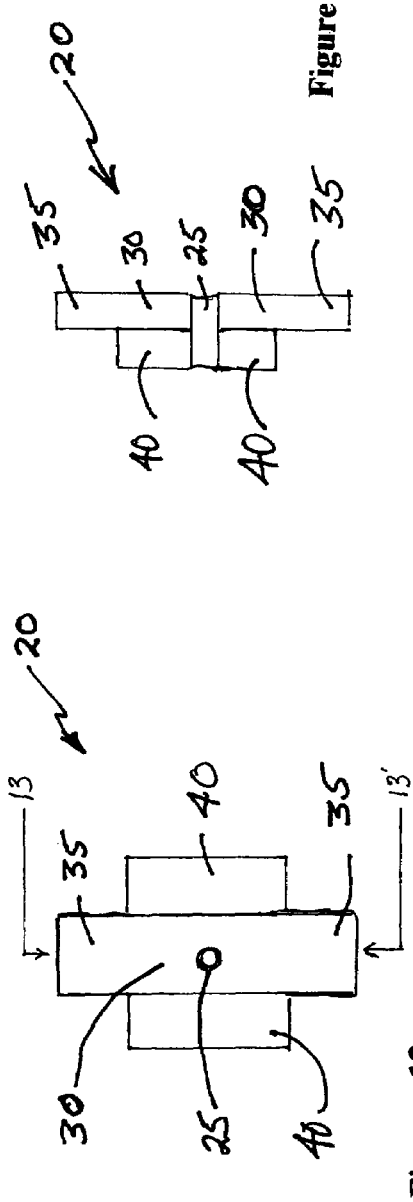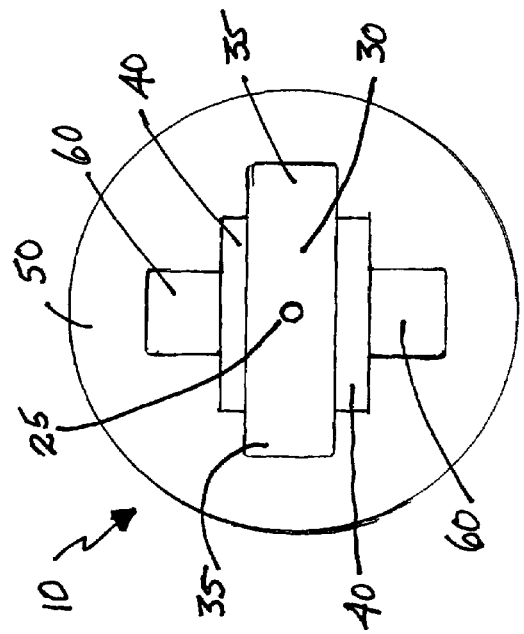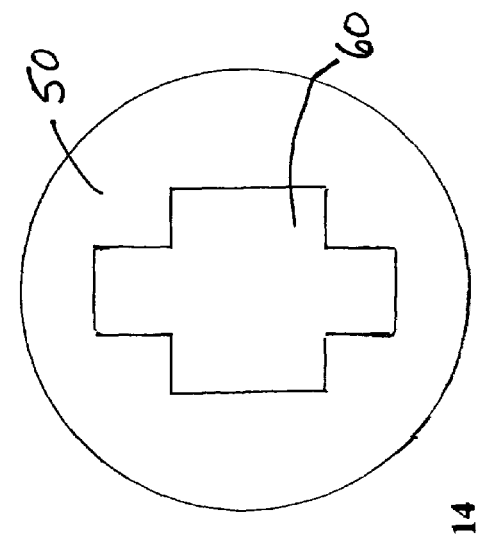

ROLLING PIN WITH REMOVABLE GUIDE DISKS

CROSS-REFERENCE TO RELATED APPLICATIONS, IF ANY

This application claims the benefit under 35 U.S.C. § 119 (e) of provisional application Ser. No. 60/486,806, filed 14 Jul., 2003 now abandoned. Application Ser. No. 60/486,806 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for rolling out dough of uniform thickness. More particularly, the present invention relates to a device that attaches to a conventional rolling pin. Most particularly, the present invention relates to a system of disks and clips that attach to a rolling pin to allow the rolling out of dough of uniform thickness.

2. Background Information

In the preparation of baked or fried goods, bakers mix flour with a liquid such as milk, water, or the like and other ingredients to form a plastic mass or dough in the preparation of bread, pastries, doughnuts and the like. After the dough is prepared, a rolling pin having a cylindrical body with a handle at each end is often used to roll out the batch of dough until the dough is approximately at a desired thickness. Often, the batch of dough is rolled into a generally circular mass having a diameter greater than the length of the cylindrical body of the rolling pin. This is accomplished by placing the rolling pin at the center of the batch and moving it radially outwardly, while applying a downward pressure on the handles at opposite ends to spread the dough to a desired thickness.

With this type of rolling pin, it is difficult to obtain a constant dough thickness, particularly from batch to batch of the dough, because the rolled out batch of dough covers the base material on which it is being rolled so that the thickness may be judged accurately only at the periphery of the mass. Also, if more pressure is applied to one handle than the other, or if more pressure is applied at the center of the mass rather than at the periphery, the thickness of the mass of dough will be non-uniform.

Some examples of inventions involving rolling pins and similar devices for which patents have been granted include the following.

Heissenbuttel, in U.S. Pat. No. 39,916, describes a rolling-pin A, which consists of a cylinder a, with flanges b, one at each end, and a handle, c. The flanges b of the finishing-pin ought to be made of metal and screwed to the ends of the wooden cylinder a, and the handle is placed loosely through the center of the cylinder, so that the latter can turn freely on the same, or the handle may be firmly secured to the cylinder, and, in this case, it must he permitted to turn in the hands as the cylinder rolls along.

In U.S. Pat. No. 353,177, Taylor discloses a pair of wheeled supports, each of which attach to one handle of a rolling pin. The wheeled supports elevate the main roller A above the surface on which the wheels K contact. The clearance beneath the main roller is adjusted by turning a screw N having a head M on each wheeled support.

Weber, in U.S. Pat. No. 359,480, describes a roller-knife that has a metallic shaft on which slips a series of circular blades with interspersed spacers to hold the blades apart a selected distance. Each end of the shaft has a handle for drawing the roller-knife across a sheet of dough to cut the dough into strips.

In U.S. Pat. No. 534,460 Wolff et al. disclose a rolling pin having spacing collars D at opposite ends of its cylindrical body A. Spindles C extend beyond the collars and are provided at their outer extremities with threaded tenons F. Gage wheels B are fitted loosely on the spindles C, to bear against the spacing collars D, and having a greater diameter than the cylindrical body, with thimbles E fitted loosely on the spindles C to bear against the gage wheels B and serving as the handles for the manipulation of the rolling pin. Nuts F are fitted on the threaded tenons to hold the thimbles in place. In one embodiment, the gage wheels B are made integral with the cylindrical body A and separated therefrom by reduced portions D, which are equivalent to the spacing collars D. The gage wheels B are grooved circumferentially to receive the tires G, which are employed to elevate the cylindrical body A of the rolling pin the desired distance above the rolling board to gage the thickness of the sheet of dough to be rolled uniformly by the pin.

U.S. Pat. No. 550,337 by Wolff et al. describes a similar rolling pin having graduated journals D–E between the sleeved handle C and the end of the cylindrical body A, in combination with a gage wheel or ring G, which is adapted to fit any one of the graduations of the journal D–E and to sustain the pin body A at different distances from the rolling surface.

In U.S. Pat. No. 1,534,907, Broecker discloses a rolling pin fitted on the ends with discs 3 of larger diameter than the body 1 of the pin. The discs 3 are removably held in position by screws 5 that protrude from the end of the body. The discs 3 are biased against the screw heads 5 by internal springs 6 to prevent the discs from falling off during use. Note, in particular, FIGS. 1, 3 and 5, showing the discs 3 held in place by the screws 5 and internal springs 6.

Lewis, in U.S. Pat. No. 2,339,492, describes a laminating roller 28 having a cylindrical drum 34 mounted on a hollow axle 38. The end sleeves 36 are each provided with an annular flange 40, which are spaced apart from the ends of the drum and operatively engage the groove 24 to maintain the roller in proper operative relation relative to the bed. The annular flanges 40 are a unitary part of the hollow axle.

In U.S. Pat. No. 2,920,389, Nurmi discloses a device for cutting dough into strips. The device includes an axle 15 upon which a plurality of cutting disks 16 are rotatably supported on the axle. The disks are mounted on the axle such that moving the device over a table, all the disks will cut and divide the sheet of dough into strips, regardless of variation in thickness of the dough or unevenness in the surface of the table.

Kuzyk, in U.S. Pat. No. 3,994,652, describes a combined rolling pin and dough cutter. It is made up mainly of a central shaft provided with a handle at each end and a series of abutting cylindrical rollers, all of the same diameter, which rotate freely upon the central shaft to function as a rolling pin. To perform as a dough cutter, a series of circular cutting discs are inserted between the rollers. These discs are of a larger diameter than the rollers, so that their cutting edge extends beyond said rollers. One handle of the shaft is permanently fixed to the shaft, while the other handle unscrews from the shaft to allow the insertion of the rollers and discs. One of the handles of the shaft is bored with a longitudinal hole into which is inserted a center pin, which is used for cutting circular sections of dough used in pie making. This is accomplished by inserting the center pin into holes provided in the central shaft, inserting one of the cutting discs a predetermined distance from the center pin, and rotating the cutting disc in a circle with the center pin as its center.

In U.S. Pat. No. 4,045,850, Brandes discloses a pin for rolling dough to variable thicknesses, the variability being under immediate control by the baker. The pin carries a rotatable gage permanently mounted on the roller in such a way that the baker can almost instantly vary the thickness of the dough that he is about to roll without substituting elements on the rolling pin and/or altering the relationship of the physical elements on the rotatable gage that make the variable thickness of the dough possible.

Abrams, in U.S. Pat. No. 4,435,145, describes an apparatus for rolling plastic material such as bread dough or cookie dough, so that the material has a substantially constant thickness throughout the entire mass. The apparatus includes an elongated cylindrical body having an outwardly extending axial handle at each end, and each of the handles has a selected gauge wheel removably mounted at the outer end thereof.

In U.S. Pat. No. 4,521,174, Kornhauser discloses a dough manipulator adapted for manually controlling the thickness of dough, which comprises a roller with handles and means for maintaining the roller at a predetermined height above a surface, wherein the means for maintaining the height of the roller is placed at a predetermined distance from the ends of the roller. Height maintaining means include spacer rings positioned on the roller or spacer strips positioned on the surface. The manipulator is used in conjunction with a surface which is substantially flat.

Conkey in U.S. Pat. No. 4,718,769 describes a dough preparation apparatus of the "dough docker" type, consisting of a shaft having a central region upon which a plurality of individual rollers are mounted in side-by-side relationship defining a roller stack. Radially extending teeth are defined upon each roller, and a gauging roller is mounted at each end of the stack of a diameter slightly greater than that of the stack rollers. Tubular sleeves are rotatably mounted upon the shaft end regions defining handles, and bolts threaded into the shaft ends maintain the assembly of components.

While the present invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention, as defined by the appended claims.

SUMMARY OF THE INVENTION

The invention is directed to a modification of a rolling pin that allows the user to roll out a sheet of dough or crust having a completely uniform thickness. Any conventional rolling pin can be modified to accept the present invention. A standard rolling pin has a cylindrical pin with an axle extending along the cylindrical axis of the pin. Each end of the axle has a handle that the user grasps to use the rolling pin on dough or crust material.

The present invention is a clip, spacer and disk system for a rolling pin. The system includes a pair of clip and spacer assemblies, each mounted to the pin central axle between a pin handle and an end of the cylindrical pin. The assembly includes a planar clip member adjacent the pin handle and a planar spacer member adjacent the cylindrical pin. Each clip and spacer assembly is smaller in diameter than the cylindrical rolling pin and larger in diameter than the pin handle. Each planar clip member includes at least one tab portion coplanar therewith. The system also includes pairs of planar guide disk members, each guide disk member having a diameter larger than the cylindrical pin. Each guide disk member has a central slot, allowing passage of the clip member with at least one tab portion there through, and positions the guide disk member about the spacer member.

Thus, inserting a pin handle through a guide disk member's central slot allows the clip member with at least one tab portion to pass there through. The guide disk member's central slot thereby encircles the spacer member. Rotational movement between the guide disk member and clip member produces misalignment of the clip member's at least one tab portion and the guide disk member's central slot, thereby locking the guide disk member in place about the spacer member. The guide disk members elevate the cylindrical pin a selected distance above a support surface. Several pairs of guide disk members are provided in various diameters, and pairs of disks can be exchanged on the rolling pin to provide different thicknesses of rolled out dough, without removing the handles of the rolling pin.

BRIEF DESCRIPTION OF THE DRAWINGS

FIG. 1 is a top plan view of one embodiment of the clip and spacer assembly of the present invention.

FIG. 2 is a sectional view along line 2–2' of FIG. 1 of the clip and spacer assembly of the present invention.

FIG. 3 is a top plan view of one embodiment of the guide disk member of the present invention.

FIG. 4 is a top plan view of the guide disk member of FIG. 3 engaging the clip and spacer assembly of FIG. 1 of the present invention.

FIG. 5 is a cross sectional view along line 5–5' of FIG. 4 of one embodiment of the guide disk member engaging a clip and spacer assembly of the present invention.

FIG. 12 is a top plan view of yet another embodiment of the clip and spacer assembly of the present invention.

FIG. 13 is a sectional view along line 13–13' of FIG. 12 of the clip and spacer assembly of the present invention.

FIG. 14 is a top plan view of yet another embodiment of the guide disk member of the present invention.

FIG. 15 is a top plan view of the guide disk member of FIG. 14 engaging the clip and spacer assembly of FIG. 12 of the present invention.

DESCRIPTION OF THE EMBODIMENTS

NOMENCLATURE

Figure 7:
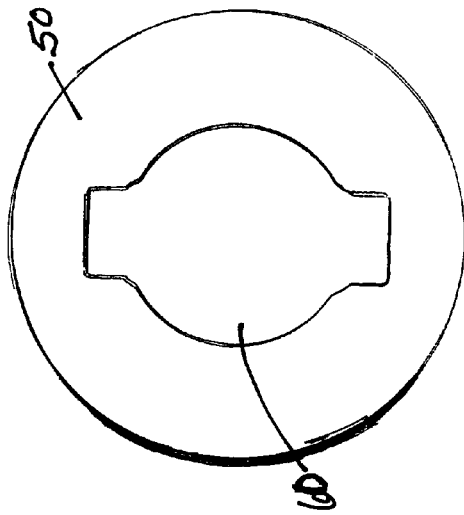
FIG. 7 is a top plan view of another embodiment of the guide disk member of the present invention.

- 10 Clip, Spacer and Disk System
- 20 Clip and Spacer Assembly
- 25 Central Aperture in Clip Member and Spacer Member
- 30 Clip Member
- 35 Tab Portion of Clip Member
- 40 Spacer Member
- 50 Guide Disk Member
- 60 Central Slot in Guide Disk Member
- 100 Rolling Pin with Clip, Spacer and Disk System
- 110 Cylindrical Rolling Pin Member
- 120 Central Axle of Rolling Pin
- 130 Handle Member of Rolling Pin Construction:

The invention is directed to the modification of a rolling pin that allows the user to roll out a sheet of dough or crust having a completely uniform thickness. Any conventional rolling pin can be modified to accept the present invention. A standard rolling pin has a cylindrical pin with an axle extending along the cylindrical axis of the pin. Each end of the axle has a handle that the user grasps to use the rolling pin on dough or crust material.

The present invention is a clip, spacer and disk system for a rolling pin. The system includes a pair of clip and spacer assemblies, each assembly mounted to the pin central axle between a pin handle and an end of the cylindrical pin. The assembly includes a planar clip member adjacent the pin handle and a planar spacer member adjacent the cylindrical pin. Each clip and spacer assembly is smaller in diameter than the cylindrical rolling pin and larger in diameter than the pin handle. Each planar clip member includes at least one tab portion coplanar therewith. The system also includes pairs of planar guide disk members, each guide disk member having a diameter larger than the cylindrical pin. Each guide disk member has a central slot, allowing passage of the clip member with at least one tab portion there through, and positions the guide disk member about the spacer member.

Thus, inserting a pin handle through a guide disk member's central slot allows the clip member with at least one tab portion to pass there through. The guide disk member's central slot thereby encircles the spacer member. Rotational movement between the guide disk member and clip member produces misalignment of the clip member's at least one tab portion and the guide disk member's central slot, thereby locking the guide disk member in place about the spacer member. The guide disk members elevate the cylindrical pin a selected distance above a support surface. Several pairs of guide disk members are provided in various diameters, and pairs of disks can be exchanged on the rolling pin to provide different thicknesses of rolled out dough, without removing the handles of the rolling pin.

Referring to FIGS. 1–5, several views of one embodiment of the clip, spacer and disk system 10 are shown. FIG. 1 shows a top plan view of the clip and spacer assembly 20, which includes a central aperture 25 for attachment of the assembly 20 to the axle 120 of a rolling pin 110. FIG. 1 shows the clip member 30 with a single tab portion 35 extending coplanar therefrom. FIG. 2 shows a cross sectional view of the clip and spacer assembly 20, along line 2–2' of FIG. 1, which includes a central aperture 25 for attaching the clip and spacer assembly 20 to the axle 120 of a rolling pin 110. FIG. 2 shows the spacer member 40 to be the same diameter as the clip member 30, except for the tab portion 35, which extends beyond a circumferential edge thereof. Each clip and spacer assembly 20 is attached to the axle 120 of a rolling pin 110, with the spacer member 40 adjacent the cylindrical pin member 110 and the clip member 30 adjacent the handle member 130.

Referring now to FIG. 3, a guide disk member 50 of one embodiment of the present invention is shown. The guide disk members 50 are circular disks and have a diameter larger than that of the rolling pin member 110. Each guide disk member 50 includes a central slot 60 that matches the contour of the clip portion 30 of the clip and spacer assembly 20. A guide disk member 50 slips over one of the rolling pin handles 130 and the clip portion 30 of the clip and spacer assembly 20. The guide disk member 50 is approximately the same thickness as the thickness of the spacer member 40, and the guide disk member 50 moves past the clip member's tab portion 35 and is rotated to bring the central slot 60 and clip member's tab portion 35 out of alignment and, thereby, locks the guide disk member 50 in place about the spacer member 20, as illustrated in FIGS. 4 and 5. The single tab portion 35 is marginally effective in retaining the guide disk member 50 on the spacer member 40 when using a rolling pin member 110 fitted with the clip, spacer and disk system 10 of FIGS. 1–5. In this embodiment of the invention, the clip and spacer assembly 20 is, preferably, of unitary construction and, preferably, secured to the end of the rolling pin member 110. The guide disk members 50 are provided in various diameters and can be exchanged on the rolling pin member 110 to provide different thicknesses of rolled out dough, without removing the handles members 130 of the rolling pin member 110.

Figure 6:
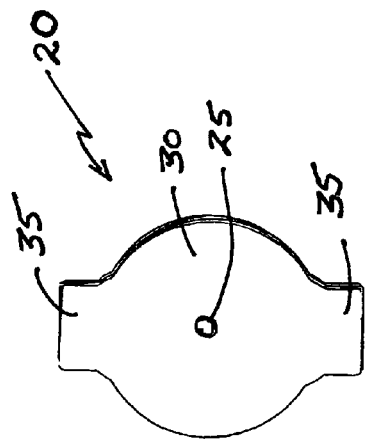
FIG. 6 is a top plan view of another embodiment of the clip and spacer assembly of the present invention.

Referring now to FIGS. 6–9, several views of another, preferred, embodiment of the clip, spacer and disk system 10 are shown. FIG. 6 shows a top plan view of the clip and spacer assembly 20, which includes a central aperture 25 for attachment of the assembly 20 to the axle 120 of a rolling pin 110. FIG. 6 shows the clip member 30 with two, opposed tab portions 35 extending coplanar therefrom. Again, the spacer member 40 is the same diameter as the clip member 30, except for the tab portions 35, which extends beyond a circumferential edge thereof. Each clip and spacer assembly 20 is attached to the axle 120 of a rolling pin 110, with the spacer member 40 adjacent the cylindrical pin member 110 and the clip member 30 adjacent the handle member 130.

Figure 9:
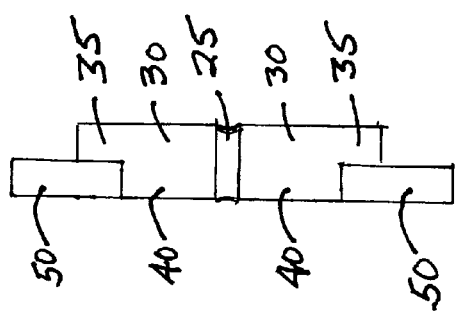
FIG. 9 is a cross sectional view along line 9–9' of FIG. 8 of one embodiment of the guide disk member engaging a clip and spacer assembly of the present invention.
Figure 8:
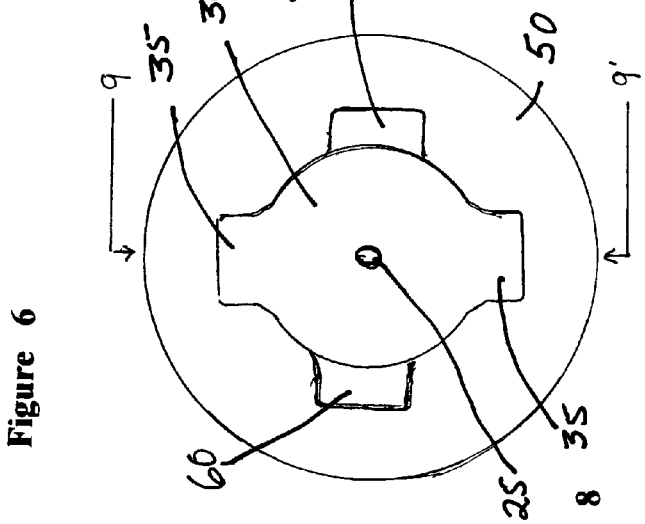
FIG. 8 is a top plan view of the guide disk member of FIG. 7 engaging the clip and spacer assembly of FIG. 6 of the present invention.
Figure 11:
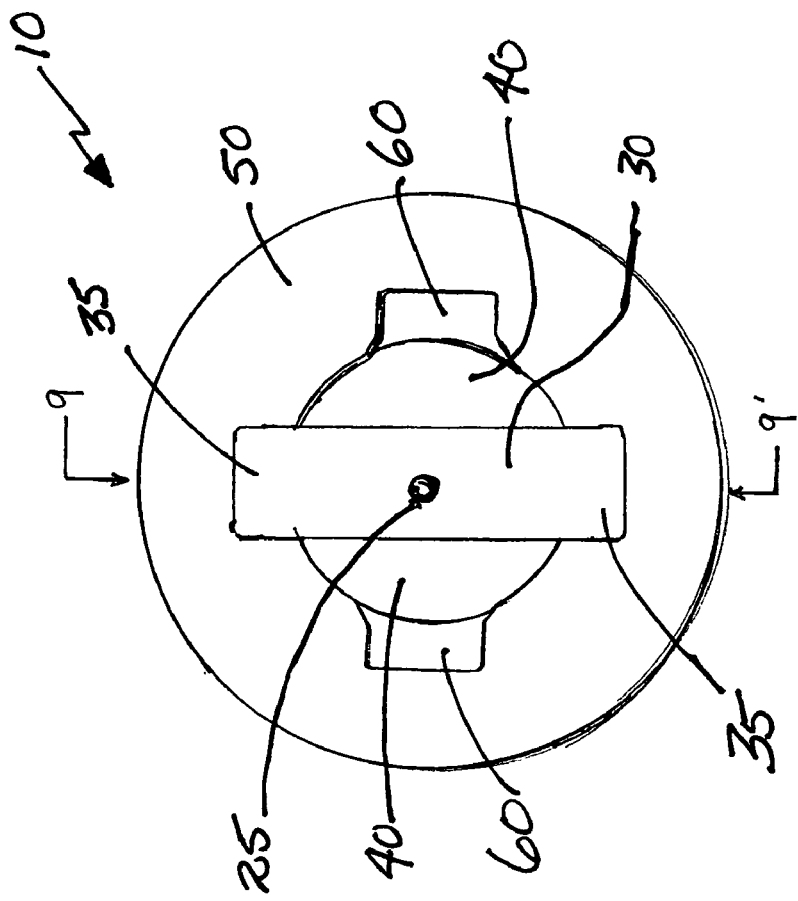
FIG. 11 is a top plan view of the guide disk member of FIG. 7 engaging the clip and spacer assembly of FIG. 10 of the present invention.
Figure 10:
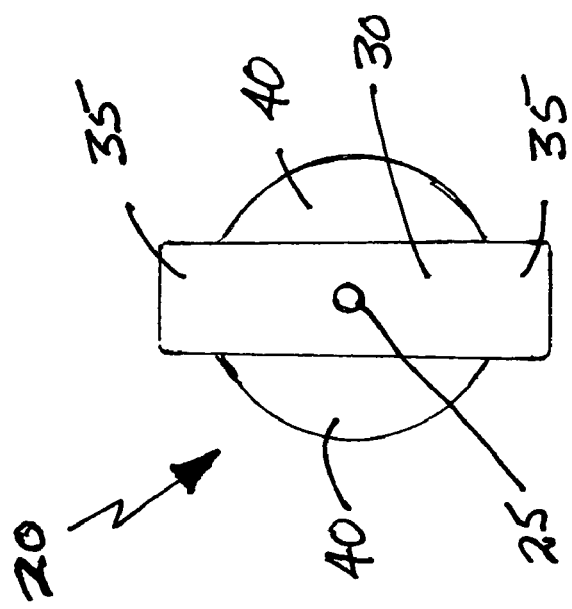
FIG. 10 is a top plan view of yet another embodiment of the clip and spacer assembly of the present invention.
Figure 16:
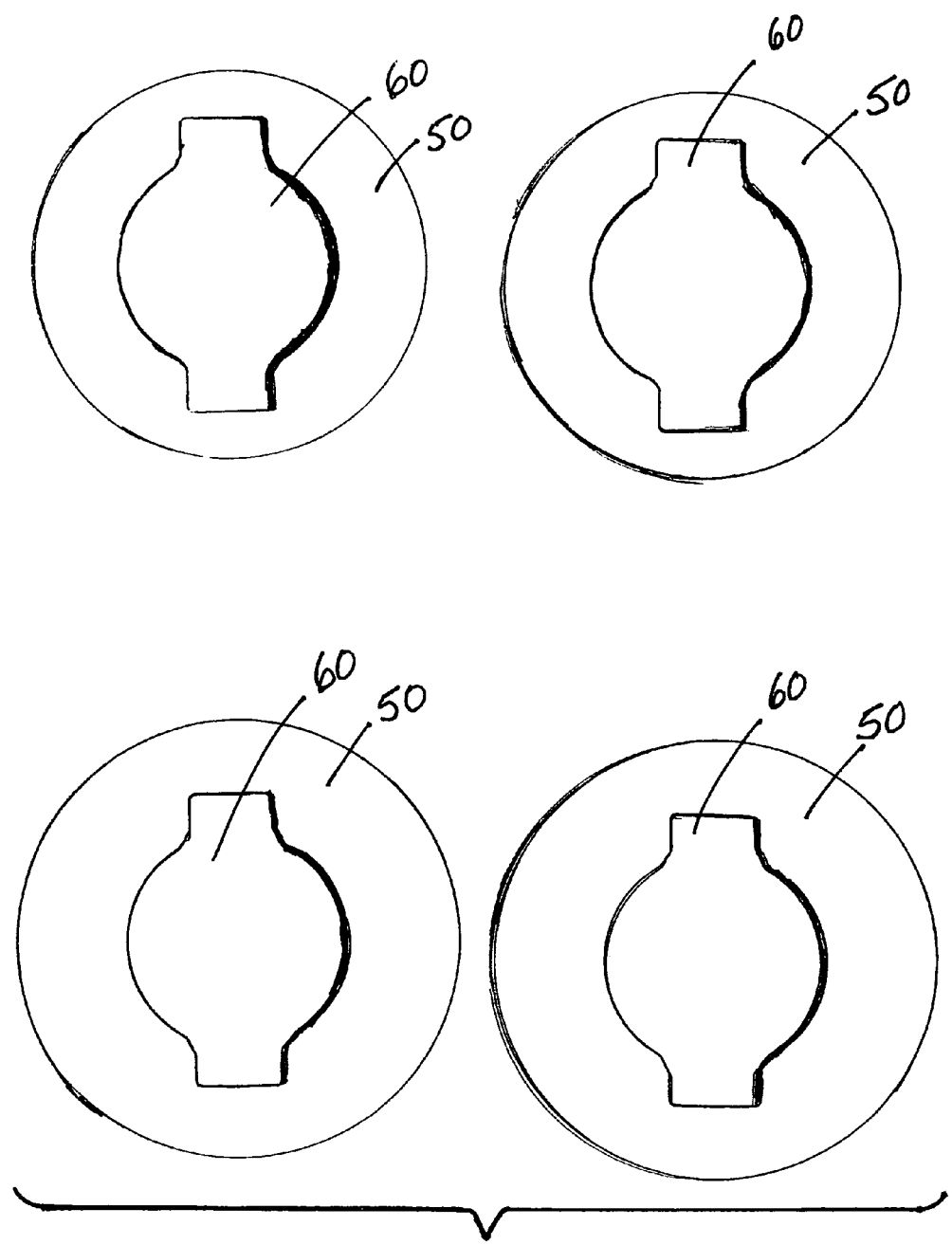
FIG. 16 is a top plan view of pairs of different sized guide disk members with a common central slot of the present invention.

Referring now to FIG. 7, a guide disk member 50 of the preferred embodiment of the present invention is shown. The guide disk members 50 are circular disks and have a diameter larger than that of the rolling pin member 110. Each guide disk member 50 includes a central slot 60 that matches the contour of the clip portion 30 of the clip and spacer assembly 20; in this embodiment it includes portions of the central slot 60 that match the tab portions 35 of the clip member 30. A guide disk member 50 slips over one of the rolling pin handles 130 and the clip portions 30 of the clip and spacer assembly 20. The guide disk member 50 is approximately the same thickness as the thickness of the spacer member 40, and the guide disk member 50 moves past the clip member's tab portions 35 and is rotated to bring the central slot 60 and clip member's tab portions 35 out of alignment and, thereby, locks the guide disk member 50 in place about the spacer member 20, as illustrated in FIGS. 8 and 9. The two tab portions 35 are very effective in retaining the guide disk member 50 on the spacer member 40 when using a rolling pin member 110 fitted with the clip, spacer and disk system 10 of FIGS. 6–9. In the preferred embodiment of the invention, the clip and spacer assembly 20 is, preferably, of unitary construction and, preferably, secured to the end of the rolling pin member 110. The guide disk members 50 are provided in various diameters (FIG. 16) and can be exchanged on the rolling pin member 110 to provide different thicknesses of rolled out dough, without removing the handles members 130 of the rolling pin member 110. Referring now to FIGS. 11 and 12, an alternative embodiment of the clip and spacer assembly 20 is shown, which again includes a central aperture 25 for attachment of the assembly 20 to the axle 120 of a rolling pin 110. FIG. 10 shows the clip member 30 with two, opposed tab portions 35 extending coplanar therefrom. In this embodiment, the clip member 30 is rectangular in shape with the two opposed ends thereof functioning as the two tab portions 35. Again, the spacer member 40 is circular to accommodate rotational movement of the guide disk member 50 to lock it in place, as illustrated in FIG. 11. The guide disk member 50 is the embodiment shown in FIG. 7. Each clip and spacer assembly 20 is attached to the axle 120 of a rolling pin 110, with the spacer member 40 adjacent the cylindrical pin member 110 and the clip member 30 adjacent the handle member 130. The cross sectional view along line 9–9' of FIG. 11, as well as the cross sectional view of FIG. 8, is shown in FIG. 9. In this embodiment of the invention, the clip and spacer assembly 20 is, preferably, of unitary construction and, preferably, secured to the end of the rolling pin member 110. The guide disk members 50 are provided in various diameters (FIG. 16) and can be exchanged on the rolling pin member 110 to provide different thicknesses of rolled out dough, without removing the handles members 130 of the rolling pin member 110.

Referring now to FIGS. 12–15, several views of another embodiment of the clip, spacer and disk system 10 are shown. FIG. 12 shows a top plan view of the clip and spacer assembly 20, which includes a central aperture 25 for attachment of the assembly 20 to the axle 120 of a rolling pin 110. FIG. 12 again shows a rectangular clip member 30 with opposed tab portions 35 extending coplanar therefrom. FIG. 13 shows a cross sectional view of the clip and spacer assembly 20, along line 13–13' of FIG. 12, which includes a central aperture 25 for attaching the clip and spacer assembly 20 to the axle 120 of a rolling pin 110. FIG. 12 shows the spacer member 40 to be non-circular, rectangular in this embodiment. Each clip and spacer assembly 20 is attached to the axle 120 of a rolling pin 110, with the spacer member 40 adjacent the cylindrical pin member 110 and the clip member 30 adjacent the handle member 130.

Referring now to FIG. 14, a guide disk member 50 of this embodiment of the present invention is shown. The guide disk members 50 are circular disks and have a diameter larger than that of the rolling pin member 110. Each guide disk member 50 includes a central slot 60 that matches the contour of both the clip portion 30 and the spacer portion 40 of the clip and spacer assembly 20; in this embodiment it includes portions of the central slot 60 that match the tab portions 35 of the clip member 30. A guide disk member 50 slips over one of the rolling pin handles 130 and the clip portion 30 of the clip and spacer assembly 20. The guide disk member 50 is approximately the same thickness as the thickness of the spacer member 40, and the guide disk member 50 moves past the clip member's tab portions 35 and encloses the spacer member 40. Because the spacer member 40 is non-circular, the guide disk member 50 cannot rotate relative thereto. In this embodiment of the invention, the clip and spacer assembly 20 comprises separate elements for the clip member 30 and the spacer member 40. Preferably, the spacer member 40 is secured to the adjacent end of the rolling pin member 110, and the clip member 30 is rotated to bring the central slot 60 of the guide disk member 50 and clip member's tab portions 35 out of alignment and, thereby, locks the guide disk member 50 in place about the spacer member 20, as illustrated in FIG. 15. The two tab portions 35 are very effective in retaining the guide disk member 50 on the spacer member 40 when using a rolling pin member 110 fitted with the clip, spacer and disk system 10 of FIGS. 12–15. Alternatively, with the clip member 30 and the spacer member 40 separate elements, the spacer member 40 may be integrally formed with an end of the cylindrical pin member 110. This particular configuration of the clip and spacer assembly 20, with a separate clip member 30 and spacer member 40, can be applied to any of the embodiment of the invention disclosed above.

Figure 17:
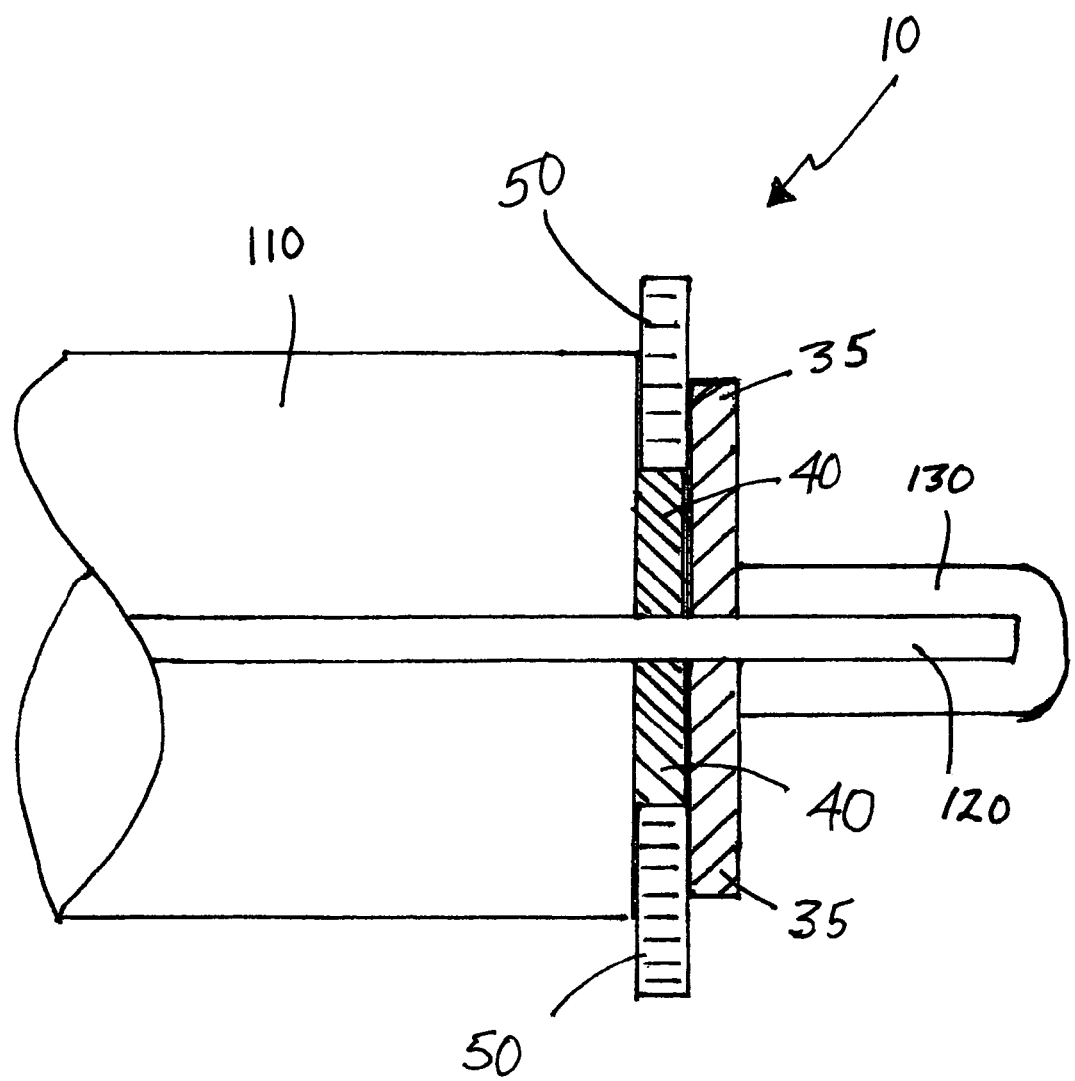
FIG. 17 is a sectional view of one end of a cylindrical rolling pin member fitted with a spacer, clip and disk system of the present invention.

FIG. 17 shows a cross sectional view of the clip, spacer and disk assembly 10, secured to one end of a rolling pin member 110. It is a simple matter to exchange one set of guide disk members 50 for another set of a different diameter (FIG. 16) to vary the thickness of the dough being rolled out with the rolling pin member 110. The present invention has the advantage that the rolling pin handles 130 need not be disconnected to change one guide disk member 50 for another one of different diameter.

Figure 18:
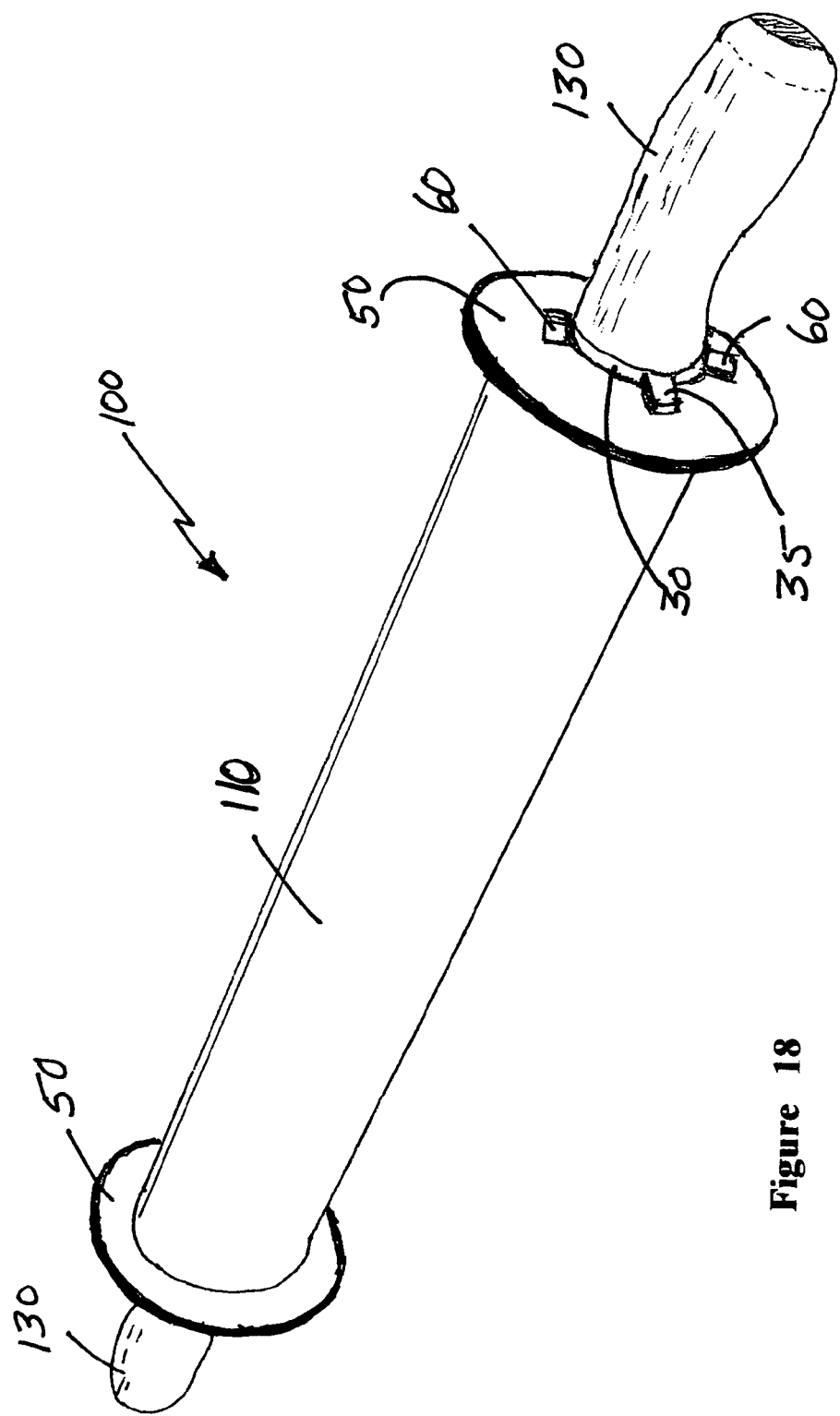
FIG. 18 is a perspective view of a cylindrical rolling pin member fitted with the spacer, clip and disk system of the present invention.

The rolling pin with clip spacer and disk system 100 of the present invention is shown in FIG. 18. A guide disk member 50 is positioned adjacent each end of the rolling pin member 110 and held in position by the tab portions 35 of each clip member 30. The rolling pin handles 130 are preferably flat on one side to provide additional clearance between the handles 130 and the support surface to accommodate the user's fingers.

While the invention has been particularly shown and described with reference to preferred embodiments thereof, it will be understood by those skilled in the art that various changes in form and details may be made therein without departing from the spirit and scope of the invention.

I claim:

1. A clip, spacer and disk system adapted for attachment to a cylindrical rolling pin having a central axle with a handle at each end, the clip, spacer and disk system comprising;
   (a) a pair of clip and spacer assemblies, each assembly mounted to the pin central axle between a pin handle and an end of the cylindrical pin, the assembly including a planar clip member adjacent the pin handle and a planar spacer member adjacent the cylindrical pin, each clip and spacer assembly smaller in diameter than the cylindrical rolling pin and larger in diameter than the pin handle, each planar clip member including at least one tab portion coplanar therewith; and
   (b) a pair of planar guide disk members, each guide disk member having a diameter larger than the cylindrical pin, each guide disk member having a central slot allowing passage of the clip member with at least one tab portion there through, and positioning the guide disk member about the spacer member;

(c) whereby, inserting a pin handle through a guide disk member central slot allows the clip member with at least one tab portion to pass there through, the guide disk member's central slot thereby encircling the spacer member, and rotational movement between the guide disk member and clip member produces misalignment of the clip member's at least one tab portion and the guide disk member's central slot, thereby locking the guide disk member in place about the spacer member, thus elevating the cylindrical pin a selected distance above a support surface.

2. The clip, spacer and disk system of claim 1 wherein, the planar clip member includes two tab portions coplanar therewith.

3. The clip, spacer and disk system of claim 2 wherein the two tab portions of the planar clip member are opposed across the clip member.

4. The clip, spacer and disk system of claim 1 wherein the planar spacer member is circular and rotational movement of the guide disk member produces misalignment of the clip member's at least one tab portion and the guide disk member's central slot.

5. The clip, spacer and disk system of claim 1 wherein, the planar spacer member is non-circular and rotational movement of the clip member produces misalignment of the clip member's at least one tab portion and the guide disk member's central slot.

6. The clip, spacer and disk system of claim 1 wherein, the planar clip member is rectangular with at least one end thereof comprising the at least one tab portion of the clip member.

7. The clip, spacer and disk system of claim 6 wherein, each end of the rectangular clip member comprises one tab portion of the clip member.

8. The clip, spacer and disk system of claim 1 wherein, the planar clip member is circular with the at least one tab portion extending beyond a circumferential edge thereof.

9. The clip, spacer and disk system of claim 8 wherein, the planar clip member is circular with two tab portions extending beyond a circumferential edge thereof.

10. The clip, spacer and disk system of claim 1 wherein, the planar spacer member and the planar guide disk member are essentially the same thickness.

11. The clip, spacer and disk system of claim 1 wherein the spacer member and the clip member of the clip and spacer assembly are separate elements.

12. The clip, spacer and disk system of claim 11 wherein, the spacer member is secured to an end of the cylindrical pin.

13. The clip, spacer and disk system of claim 11 wherein, the spacer member is integrally formed with an end of the cylindrical pin.

14. The clip, spacer and disk system of claim 1 wherein, the spacer member and the clip member of the clip and spacer assembly are a single unit.

15. The clip, spacer and disk system of claim 14 wherein, the clip and spacer assembly is secured to an end of the cylindrical pin.

16. A clip, spacer and disk system adapted for attachment to a cylindrical rolling pin having a central axle with a handle at each end, the clip, spacer and disk system comprising;

(a) a pair of clip and spacer assemblies, each assembly mounted to the pin central axle between a pin handle and an end of the cylindrical pin, the assembly including a planar clip member adjacent the pin handle and a planar spacer member adjacent the cylindrical pin, each clip and spacer assembly smaller in diameter than the cylindrical rolling pin and larger in diameter than the pin handle, each planar clip member including two tab portions coplanar therewith; and (b) a pair of planar guide disk members, each guide disk member having a diameter larger than the cylindrical pin, each guide disk member having a central slot allowing passage of the clip member with two tab portions there through, and positioning the guide disk member about the spacer member;

(c) whereby, inserting a pin handle through a guide disk member's central slot allows the clip member with two tab portions to pass there through, the guide disk member's central slot thereby encircling the spacer member, and rotational movement between the guide disk member and clip member produces misalignment of the clip member's two tab portions and the guide disk member's central slot, thereby locking the guide disk member in place about the spacer member, thus elevating the cylindrical pin a selected distance above a support surface.

17. The clip, spacer and disk system of claim 16 wherein, the two tab portions of the planar clip member are opposed across the clip member.

18. The clip, spacer and disk system of claim 16 wherein, the planar spacer member is circular and rotational movement of the guide disk member produces misalignment of the clip member's two tab portions and the guide disk member central slot.

19. The clip, spacer and disk system of claim 16 wherein, the planar spacer member is non-circular and rotational movement of the clip member produces misalignment of the clip member's two tab portions and the guide disk member central slot.

20. The clip, spacer and disk system of claim 16 wherein, the planar clip member is rectangular with each end thereof comprising the tab portions of the clip member.

21. The clip, spacer and disk system of claim 16 wherein, the planar clip member is circular with two tab portions extending beyond a circumferential edge thereof.

22. The clip, spacer and disk system of claim 16 wherein, the planar spacer member and the planar guide disk member are essentially the same thickness.

23. The clip, spacer and disk system of claim 16 wherein, the spacer member and the clip member of the clip and spacer assembly are separate elements.

24. The clip, spacer and disk system of claim 23 wherein, the spacer member is secured to an end of the cylindrical pin.

25. The clip, spacer and disk system of claim 23 wherein, the spacer member is integrally formed with an end of the cylindrical pin.

26. The clip, spacer and disk system of claim 16 wherein, the spacer member and the clip member of the clip and spacer assembly are a single unit.

27. The clip, spacer and disk system of claim 26 wherein, the clip and spacer assembly is secured to an end of the cylindrical pin.

28. A rolling pin with a clip, spacer and disk system comprising;

(a) a rolling pin including a cylindrical rolling pin member having a central axle with a handle at each end thereof; and (b) a clip, spacer and disk system secured to the rolling pin, the system including;
(i) a pair of clip and spacer assemblies, each assembly mounted to the pin central axle between one pin handle and an end of the cylindrical pin, the assembly including a planar clip member adjacent the pin handle and a planar spacer member adjacent the cylindrical pin, each clip and spacer assembly smaller in diameter than the cylindrical rolling pin and larger in diameter than the pin handle, each planar clip member including at least one tab portion coplanar therewith; and
(ii) a pair of planar guide disk members, each guide disk member having a diameter larger than the cylindrical pin, each guide disk member having a central slot allowing passage of the clip member with at least one tab portion there through, and positioning the guide disk member about the spacer member;
(iii) whereby, inserting a pin handle through a guide disk member's central slot allows the clip member with at least one tab portion to pass there through, the guide disk member's central slot thereby encircling the spacer member, and rotational movement between the guide disk member and clip member produces misalignment of the clip member's at least one tab portion and the guide disk member's central slot, thereby locking the guide disk member in place about the spacer member, thus elevating the cylindrical rolling pin member a selected distance above a support surface.

* * * * *